Figure 5:
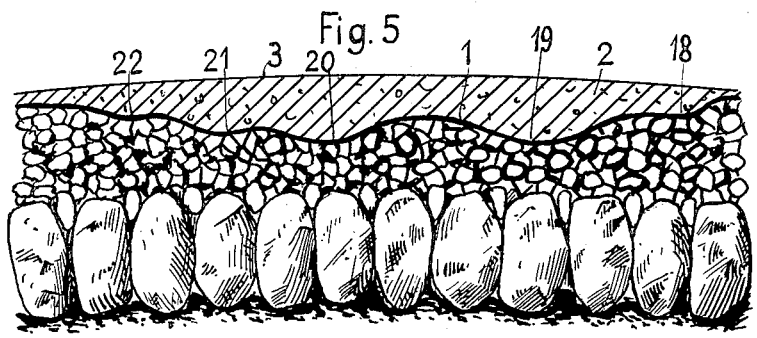

Oct. 21, 1924.
E. MENDE
METHOD OF MAKING SURFACE COVERINGS
Filed Aug. 25, 1921      3 Sheets-Sheet 1
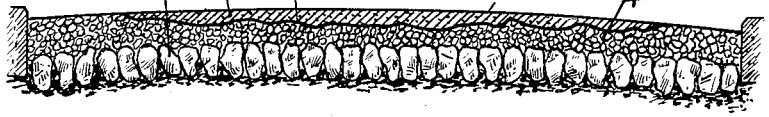
Fig. 1
Fig. 1ª
Fig. 1ᵇ
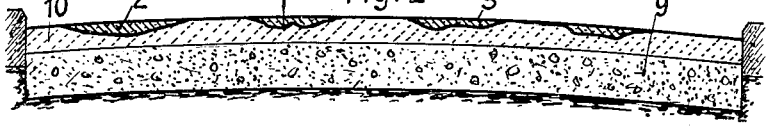
Fig. 2
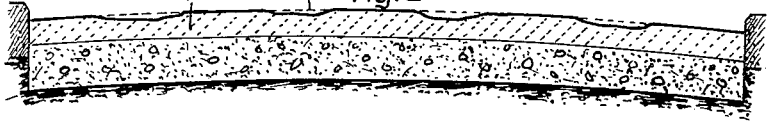
Fig. 2ª
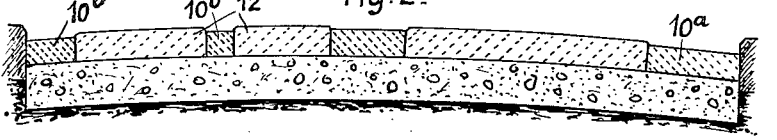
Fig. 2ᵇ

Oct. 21, 1924.
E. MENDE
1,512,125
METHOD OF MAKING SURFACE COVERINGS
Filed Aug. 25, 1921   3 Sheets-Sheet 2
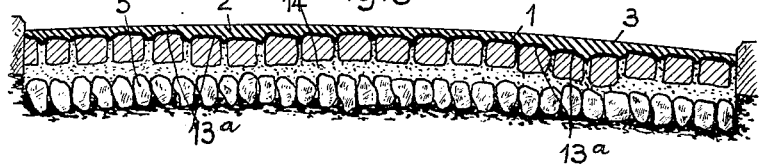
Fig. 3
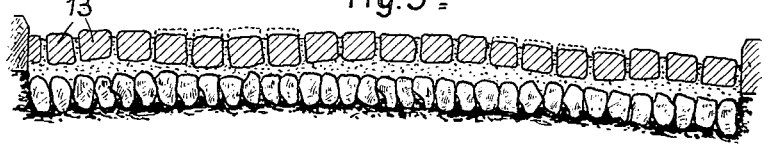
Fig. 3ª
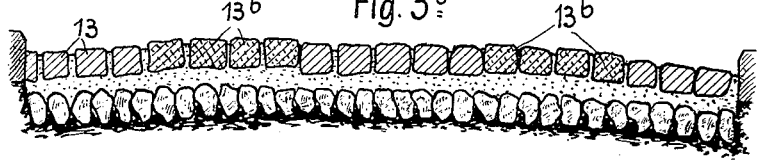
Fig. 3ᵇ
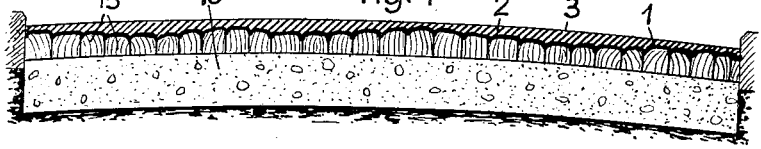
Fig. 4
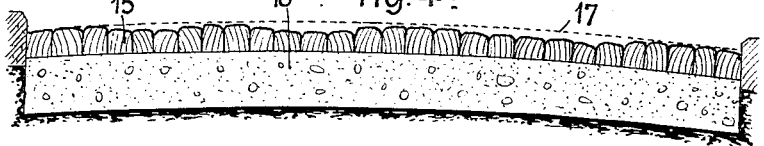
Fig. 4ª
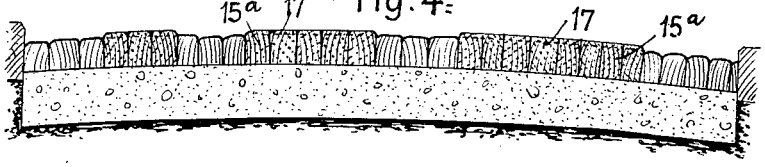
Fig. 4ᵇ

Patented Oct. 21, 1924.

1,512,125

UNITED STATES PATENT OFFICE.

EMMANUEL MENDE, OF BERN, SWITZERLAND.

METHOD OF MAKING SURFACE COVERINGS.

Application filed August 25, 1921. Serial No. 495,200.

*To all whom it may concern:*

Be it known that I, EMMANUEL MENDE, a citizen of the Confederation of Switzerland, residing at Bern, in the Canton of Bern and Confederation of Switzerland, have invented certain new and useful Improvements in Methods of Making Surface Coverings (for which I have filed an application in Switzerland Feb. 28, 1914, patented May 1, 1922, No. 94,381), of which the following is a specification, reference being had to the accompanying drawings.

In addition to durability, the essential requirements which are imposed upon the surfacing or covering of streets, highways, squares, terraces and other places subjected to traffic or to the influence of the atmospheric elements, are somewhere about the following: The surfacing is to be prepared so that it is, taking into consideration the traffic to be borne and other demands, as solid and level as possible, without its being excessively smooth; that it is as dustless and noiseless as practicable; that it readily drains and dries off and may be easily cleaned; and that the aggregate of the costs of original construction and maintenance is as small as possible. There is practically no surfacing which can at once answer all these requirements. The most widely distributed and cheapest street-covering (macadam) is not sufficiently durable and is, besides, very dust-forming and mud-producing; compressed (e. g., rolled, rammed) asphalt and pavement of stone and wood are too costly to be commonly employed and molten asphalt is, as a street-covering, likewise too dear and too slippery. Moreover, in connection with all these surfacings, certain injurious influences manifest themselves and, after a shorter or longer period of time, work destructively upon the street-covering; such are lack of uniformity of the density of the covering material, the interruption of the continuity of the covering and the action of the atmospheric elements. Lack of uniformity in density and hardness becomes observable especially with macadam and stone pavements and induces individual spots to offer less resistance than do others, to the shocks produced by horses' hoofs and to the grinding and sucking action of vehicle-wheels. Defects of a similar kind affect adversely, however, the solidity of other street-surfacings, also; for example, in the case of compressed asphalt, the powdered asphalt is treated at a temperature not sufficiently high, so that it is only at the surface that there occur a complete liquefaction of the bitumen and, consequently, a uniform binding together of all the particles to produce a homogeneous entirety, while, in the substrata, the liquefaction and cementing action remain incomplete, from which it results that, after the solid, wear-resisting upper layer is worn away, the soft layers beneath are rapidly destroyed. Likewise, in the case of wooden pavement, inequalities in density and hardness are not to be avoided, in spite of the most careful selection of the wooden blocks.

If now there be formed, in the street-covering, even only an extremely small cavity, as a result of ununiform density and hardness and the unequal wearing away thereby brought about, this cavity or depression will be rapidly deepened and widened by the pounding action of the wagon-wheels that now sets in.

Discontinuity of surfacings are produced by joints between abutting surfaces, in the case of street-coverings consisting of slabs, stone and wood, by the rails of street-railways, by covers of manholes, of hydrants and the like, by the seams or joints which are, in connection with working with compressed and poured (i. e., molten) asphalt, the result of fixing the boundaries of tracts laid down, from time to time, by workmen, and so on. This discontinuity has, without mentioning the fact that it calls forth or induces the pounding action of wheels rolling over the joints and other interruptions, the disadvantage that it augments the influence of the third of the hereinbefore-mentioned injurious factors,—the atmospheric elements. To the latter belong moisture resulting from precipitation, heat, cold; the two last-named act with a destructiveness that is entirely peculiar in connection with the rapid alternation from freezing to thawing out again. For example, should there be developed, as a result of ununiform density or of discontinuity, a cavity or depression which, by pounding action, becomes enlarged, water collects in this cavity and penetrates into the finest hairlike cracks and crevices, which are widened by bursting action due to freezing of the water. In this way, not only does it gradually make for itself a path leading still further into the bottom of the depression, and widens the joints and other interruptions, but it also, at the same time, disintegrates the material, so that the latter yields still more readily to mechanical wear. Finally, the water may penetrate through crevices, even between the street surfacing and its solid substratum, particularly since, where no union between these two exists, an injurious influence can be exerted by the water from underneath outwardly.

As a result of the conjoint action of all three factors, an originally smooth and level surfacing becomes, therefore, after a shorter or longer period of time, ever more and more rough, because each depression is pounded out still larger by the tumbling of the wagon-wheels down from the less worn-away and hence higher places, which produces an effect like that of the blow of a hammer. Such a street-covering, lacking smoothness and partially lacking in water-tightness, is, moreover, not susceptible of being kept clean beyond objection; it permits, with the formation of dust and mud, the springing up of pools in the depressions, after every rainfall. If repair-work is no longer to be avoided, there is (for example, in the case of a surfacing of macadam) torn up the entire street-covering; therefore, the top layer, which is precisely the one that has, through the effects of traffic, become hard and solid by travel, is disintegrated again, overlaid with eight to twelve centimeters of road-ballast and again rolled solid.

In the case of asphalt streets, large portions of the asphalt layer will be chopped out and a fresh layer of asphalt will be put upon the cement-concrete bed. In the case of stone-pavement, the very stones, which lie in holes and, therefore, stick particularly firm and fast in the ground, (which surely should be the most desirable condition for a street), are again loosened and taken up and the whole street-covering is levelled anew. All these pieces of work involve the closing of the street concerned, for the period of a day and often a week or month and, consequently, appreciable disturbances of traffic, without mentioning at all the fact of the high cost of such repairs. Moreover, the places that have been repaired naturally possess all the drawbacks of the replaced covering, together with those introduced by the repairs. To the latter belong, for example, the circumstance that, in the case of compressed asphalt and stone pavement, the spots where repairs have been made are somewhat higher than the old parts roundabout them, and the result of this circumstance or condition is to induce a pounding action on the spots in question. In connection with the patching of asphalt streets, the continuity of the covering is broken up, and so on.

It was then attempted, by putting tar over the outer surface of the street, to reduce to a minimum the creation of dust and noise. Practical experience has long ago shown that, for the construction of streets, tar is, when directly employed, entirely unsuited and that street-coverings treated according to these methods have been, when subjected to heavy traffic, wholly destroyed after a short time, even after a few weeks or months.

The object of the present invention is to avoid the hereinbefore-mentioned drawbacks of the street-coverings heretofore commonly used and to render practicable the production of a street-covering which will prove to be at once solid and cheap, upon all places exposed to traffic or to the atmospheric elements and, indeed, upon all kinds of hard foundations, therefore, for example, equally well upon new, hard road-beds as upon road-coverings that are in need of repairs.

According to the method forming the subject-matter of this invention, the present hard foundation is thoroughly cleaned and dried and is thereupon heated, and, while still in a heated condition, is provided with a thin skin of soft pitch which adheres firmly to the foundation and upon which the new covering is introduced, while hot, by means of which the thin skin of soft pitch forms a binding medium between the hard foundation and the new covering, so that the whole adheres together to form a monolithic mass.

By the term, soft pitch, is to be understood, as is well known, a mixture of hard pitch,—the end-product either of the distillation of tars or mineral oils of all kinds, or of the working up of asphaltic rocks and mineral pitches,—and of the heavy oils which pass over as the last fraction in the distillation of tars, mineral oils and mineral pitches. Soft pitch is immiscible with water and does not volatilize. At ordinary temperatures, it is a tough, rubberlike mass. It is not transformed into vapor until a temperature of about 300° C. is reached, and it is very resisting to the action of the atmospheric elements. It becomes resinous, that is to say, becomes oxidized, only when it is spread out in an exceedingly thin layer in the state of a hot, thin liquid. The properties of soft pitch are furthermore defined in my pending application, Serial No. 799,051, filed November 3, 1913, to which reference may be had, for a more full description of this substance.

With this material, the process may, by way of example, be carried out in the following manner: The existing hard foundation, for example, a repairs-requiring street-covering, which may consist of macadam, asphalt, pavement of stone or wood, cement, or some other material, is, first of all, thoroughly cleansed of all loose material (dust, mud, mire, and the like), and made perfectly dry; this is necessary, because loose material and dampness might prevent the firm adhesion of the thin skin of soft pitch to the substratum. Then the latter is highly heated, which may be accomplished by pouring upon it a combustible oil and igniting the same, by causing flames to beat upon it, or by passing heated rolls thereover. The object of this high heating is to prevent the soft pitch from solidifying and hardening too rapidly upon coming into contact with the substratum, which solidification and hardening sets in even at 60°—70° C., and hence the soft pitch does not, in such a case, become united intimately enough with the substratum. Then the substratum, while still intensely hot, is coated with an exceedingly thin layer of hot, suitably boiling, soft pitch, that is, soft pitch heated to from 250°–300° C., by which is herein meant and which is herein characterized and designated as a very high temperature. This soft pitch penetrates into the pores of the substratum and adheres to the rough outer surface thereof. Then the new street-covering or surfacing will, either by hand or by machine, be spread while hot. This new surfacing may consist, for example, of asphalt, which unites so firmly with the skin of soft pitch, that a layer of only from one half of a centimeter to one centimeter of asphalt suffices, in order to obtain a street-covering that is absolutely susceptible of offering resistance, and durable. However, there may be employed even sand, broken stone, slag (for example, from blast furnaces, boiler furnaces, central heating plants, etc.), as well as sawdust or turf, which, according to the mixing process or to the bath-and-drip process likewise are coated with a thin skin of soft pitch. The new covering, thus prepared, must be spread as hot as possible, in order that it will melt along with the thin skin that is adhering to the supporting substratum, and becomes perfectly united with this thin skin and in the particles thereof among themselves, so that the whole forms a tough monolithic mass which rapidly hardens as a result of the chilling and of the rapidly-progressing oxidation of the soft pitch but which, because of the elasticity of the soft pitch, never becomes brittle. With the new surfacing, all depressions, holes and joints of the old street covering will be filled up and levelled and then the whole, if necessary or desirable, will be covered over with a more or less thick layer of the same material; for a thin layer, there may be used, for example, sand, the particles of which would be covered, proceeding according to the mixing method, with a pellicle of soft pitch. Thereupon the covering stratum is compressed by passing rolls (e. g., iron hand-manipulated rolls) thereover; it may then again receive a thin coating of soft pitch and be scoured off with sand, in the customary manner.

The oxidation of the soft pitch, in case the described working conditions are strictly observed, proceeds so rapidly that the street may be opened to traffic directly after the finished stage of the new road-covering has been reached. Should the new surfacing, in the course of time, exhibit inequalities as a result of ununiform compression by the traffic, the process may be repeated. The surfacing becomes then, through the action of the traffic and the successive employments of the process, ever more uniform and more capable of offering resistance and ever more like a monolithic and homogeneous covering.

The pellicles of soft pitch present in the new surfacing, particularly the one occurring between the road-bed and the covering thereof, are elastic; the latter pellicle will, even in case the traffic is heavy and the surfacing is relatively thin, not be crushed. It responds to every normal or fair demand made upon it and is capable of permanently performing its function, which consists in uniting the surfacing to the supporting substratum. The surfacing prepared in accordance with the method hereinbefore described, is waterproof, elastic, stickes together well, and is, above all, readily and cheaply carried out and maintained in repair; it is easy to cleanse and permanently resisting to acids, frost, moisture, and heat (that is to say, solar heat).

A further advantage of the present process consists, as a result of the employment of soft pitch, in that the entire body of the covering rapidly and perfectly unites, so that streets, squares and other surfaces provided therewith may immediately (that is to say, approximately half an hour after the completion of the construction or repair) be again thrown open to traffic and that, furthermore, for the laying of the covering, not the entire traffic upon the street needs to be blocked out. For, example, one half of a street may first be furnished with the surfacing and, in the meantime, the other half may be left open to traffic, and then the traffic may be passed over the half that has been made ready, in which case the other part of the street is to be attacked. The blocking, for a week or a month, of streets that are to receive a new surfacing or to be repaired, is done away with entirely, in carrying out the new method. The greater cheapness results especially from an important saving in surfacing material and cementing material, in comparison with other methods. For the preparation of tar-ballast according to the method commonly used up to the present time, there are employed from seventy to one hundred kilograms (70–100 kg.) of tar per cubic meter of ballast; while for the ballast that is employed in connection with the present method, there are added only twenty-five to forty kilograms (25–40 kg.) of soft pitch per cubic meter of ballast. Furthermore, for the new surfacing, thicknesses of from one and one-half to three centimeters (1½ to 3 cm.) suffice. The surfacings hitherto known exhibit thicknesses of from five centimeters (for asphalt) to fifteen centimeters (for macadam). Moreover, in the case of the present method, there may be employed every rock and slag material of inferior quality, which heretofore was not to be used at all for such a purpose. For these reasons, the new method may be employed not only for trade routes and places but also for country and village roads and unquestionably represents an important technical and economical advance as compared with the methods of road construction and road maintenance heretofore known.

Figure 6:
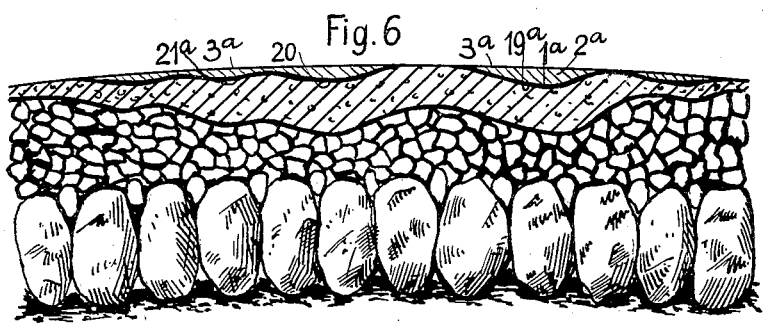
Figure 7:
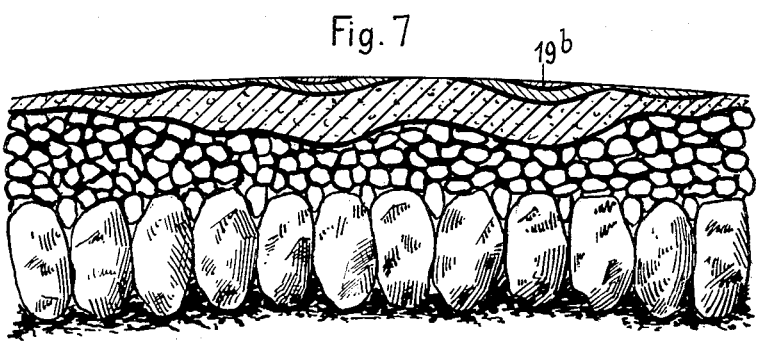

In the accompanying drawings, there are illustrated, for the better explanation of the invention, a few examples of the employment of the method, which are arranged opposite examples illustrative of methods hitherto used. In the drawings, Fig. 1 shows, in cross-section, a deeply-rutted, macadamized street, which, in accordance with the present method, has been coated with a pellicle of soft pitch, without the removal or tearing up of the old street-covering; Fig. 1ª illustrates, in similar cross-section, the same road before the repair thereof; Fig. 1ᵇ is a cross-section of the same road after its repair according to a method commonly used; Fig. 2 is a cross-section of an asphalt-surfaced road, the asphalt pavement of which has become worn away and the road having been repaired in accordance with the present method; Figs. 2ª and 2ᵇ are cross-sections of the same road, Fig 2ª showing the road before any repairs have been made thereto and Fig. 2ᵇ showing the road after its repair by an old method. Figs. 3, 3ª and 3ᵇ are cross-sections of a road having a stone pavement, Fig. 3 illustrating the road after its repair by the present method, Fig. 3ª showing the road prior to its repair and Fig. 3ᵇ depicting the road as having been repaired in accordance with former practice; and Figs. 4, 4ª and 4ᵇ are cross-sections of a road provided with a wooden pavement and illustrates, respectively, the road after its repair by the present method, before its repair, and after its repair in accordance with a method heretofore employed; Figs. 5, 6 and 7 show how a road-covering, which has been repeatedly repaired in accordance with the present invention, gradually becomes ever more uniformly dense, more homogeneous and more monolithic, Fig. 5 illustrating (on an enlarged scale) a portion of the repaired road-section shown in Fig. 1, and Figs. 6 and 7 showing the same repaired road-section after it has become more and more worn away and still further repaired.

Referring to Figs. 1, 1ª and 1ᵇ, in which a macadamized road is illustrated, the old road-covering 4 overlies the stone road-bed 5, and none of this old road-covering 4 has been removed or torn up (see Fig. 1ª, wherein the dotted line 6 indicates the original outermost surface of the road-covering). The rutted surface of the old road-covering 4 is coated, in accordance with the present invention (Fig. 1), with a pellicle or thin skin 1 of soft pitch, upon which there is applied or laid the new surfacing 2. Over the latter, there is next spread a thin coating 3 of soft pitch. According to the old method, the road-covering 4 was broken with a pick or otherwise torn up as far as the line 7, Fig. 3ᵇ, whereupon a new layer of road-ballast, of a depth of eight to fifteen centimeters (8–15 cm.), was introduced and rolled in.

In Fig. 2ª, there is shown a cross-section of a road having an asphalt pavement 10 (five) (5) centimeters in depth, which pavement overlies a cement-concrete substratum or foundation 9 twenty (20) cm. in depth and has been worn away, the original surface line being indicated at 11. As in the case of the road illustrated in Fig. 1, a thin skin 1 of soft pitch is applied to the asphalt covering 10, then the new road-covering 2 is laid and finally the pellicle 3 of soft pitch is spread thereover. According to the old method, the asphalt covering 10 would be chopped away so as to leave the strips 10ª, 10ᵇ, and there would be placed the new road-covering 12, which, as Fig. 2ᵇ clearly shows, must be rather higher than the somewhat worn-away remnants of the old road-covering 10 remaining standing in place.

Figs. 3, 3ª, and 3ᵇ are transverse sectional views that relate to a road having a stone pavement 13, which is depicted, in Fig. 3, as having become, due to the traffic, somewhat worn away and sunken, from about the middle of the road to the sides thereof. The paving stones in the vicinity of the worn and sunken ones exhibit the deformation-producing effect of the pounding action of the wagon-wheels, which caused settling. Underneath the paving stones 13 lies a bed 14 of sand. The thin skin 1 (Fig. 3) of soft pitch is applied to the paving stones 13, which are left in their positions relative one to another. The new road-surfacing 2 is covered with a second thin skin 3 of soft pitch. Fig. 3ª is a view in cross-section of the road prior to the making of any repairs thereto, and the original positions of the sunken paving-stones 13 are indicated by the dotted lines in Fig. 3ª. For the purpose of making repairs heretofore, the latter would have been raised from out of the sand-bed 14, and, after filling in underneath them with sand, they would have been again set in, so that they would have projected somewhat above the paving stones left standing.

Figs. 4, 4ª, and 4ᵇ are views that illustrate in transverse section, a road having a wooden pavement, of which the blocks 15 are worn away, more and more, towards the middle of the road. The foundation-layer 16 is of cement-concrete, and, between the thin coatings 1, 3, of soft pitch is arranged the new surfacing 2. Fig. 4ª illustrates, in cross-section, the same road prior to its being repaired and the original outermost surface thereof is indicated by the dotted line 17. Fig. 4ᵇ depicts how the new blocks 15ª, which have been set in place after taking out the worn-out blocks in accordance with the old method, project above the somewhat worn blocks 15 which remain standing, and also above the line 17 that indicates the original surface of the road.

In Figs. 5 to 7, there is illustrated how a street (or road) covering, after having been subjected to repeated repairs in accordance with the present invention, and under action of traffic, gradually becomes ever more uniformly dense, more homogeneous and more monolithic. Fig. 5 shows, on an enlarged scale, a part of the cross-section illustrated in Fig. 1. The old macadamized covering displays five channels or hollows 18, 19, 20, 21, 22, worn therein and filled up with new surfacing material. The material of the new covering present in such depressions becomes more firmly compressed by the traffic than the thin surfacing resting on the less travel-worn places of the old covering and, in fact, this compression naturally increases about proportionally to the depths of the original depressions. In the course of time, therefore, there will form new depressions, of which the depth attains only a certain percentage of that of the old depressions. In the case of the example illustrated in Fig. 5, there are present three relatively deep depressions, 19, 20, 21, while two others, 18, 22, are insignificant. Over the latter, there will come into existance, in the new surfaceing, hollows that are only barely perceptible, while, over the others (19, 20, 21), as is depicted in Fig. 6, three new cavities (19ª, 20ª, 21ª) will form. The process will now be repeated, in that, having regard, first of all, to the foregoing directions, the depressions are furnished with a new thin skin 1ª of soft pitch and, upon this skin, a new surfacing 2ª is spread, smoothing out the inequalities, and, upon this new surfacing, a fourth thin skin 3ª of soft pitch is put. The traffic now effects, once again, a compression of the new surfacing over the depressions 19ª, 20ª, 21ª, which compression, however, again attains only a certain percentage of the depth of these hollows, so that there is once more formed, in the surfacing 2ª, but still over only the deepest hole 19ª, a perceptible cavity 19ᵇ, as is represented in Fig. 7. For the filling-up of this cavity, the process is once more repeated. In this way, there comes into existence, in time, through the effect of the traffic and the repeated employment of the present method, a level, monolithic road-covering, compressed so as to be of absolutely uniform density and hardness and offering, to an extraordinary degree, resistance to the action of the traffic and of the atmospheric elements.

I claim:

1. Process for the manufacture of a cheap, homogeneous and monolithic covering for surfaces which are exposed to the action of traffic and the influence of the atmospheric elements, characterized in that, as a binding medium between an existing hard substratum and newly-provided sections of surface-covering, there is laid, upon the substratum after thoroughly cleansing and drying the same, followed by a high heating thereof, a firmly-adhering, very highly heated thin skin of soft pitch, upon which additional sections of the new surface-covering are spread in a hot state, producing a lasting union between the newly-provided sections of surface-covering and the existing substratum or individual portions of the same and effecting a knitting together of the surface-covering and substratum into a monolithic mass.

2. Process for the manufacture of a cheap, homogeneous and monolithic covering for surfaces which are exposed to the action of traffic and the influence of the atmospheric elements, including the steps of cleansing, drying and then highly heating the existing substratum; laying thereover an exceedingly thin skin or film of liquid bituminous matter heated to a temperature of approximately 250° C.; and spreading upon the bituminous matter the new surface covering while the latter is as hot as permissible for handling.

Signed at Bern, in the Canton of Bern and Confederation of Switzerland, this 11th day of August, 1921.

EMMANUEL MENDE.